May 4, 1954          H. N. JENKS          2,677,657

TREATING OF SEWAGE OR OTHER POLLUTED LIQUIDS

Filed Feb. 5, 1952          5 Sheets-Sheet 2

INVENTOR:
HARRY N. JENKS,
BY
ATTORNEY

May 4, 1954  H. N. JENKS  2,677,657
TREATING OF SEWAGE OR OTHER POLLUTED LIQUIDS
Filed Feb. 5, 1952  5 Sheets-Sheet 4
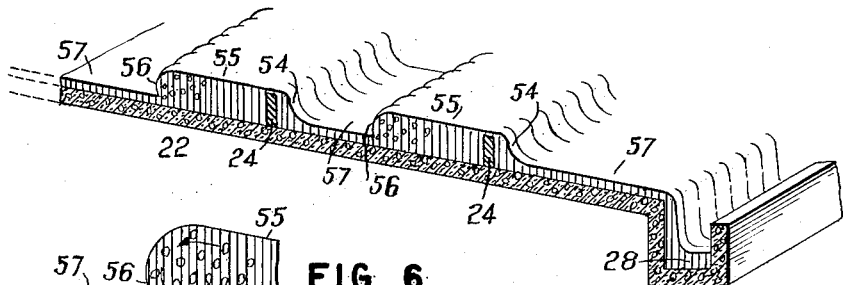
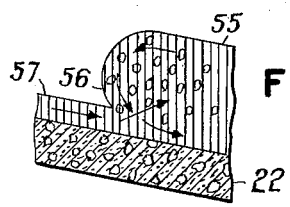
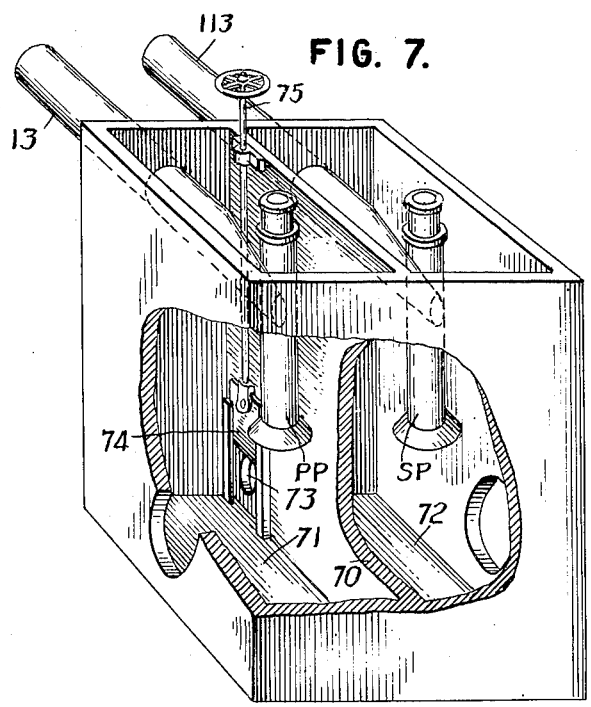
INVENTOR
*Harry N. Jenks*
BY *Arthur Middleton*
ATTORNEY May 4, 1954 H. N. JENKS 2,677,657
TREATING OF SEWAGE OR OTHER POLLUTED LIQUIDS
Filed Feb. 5, 1952 5 Sheets-Sheet 5
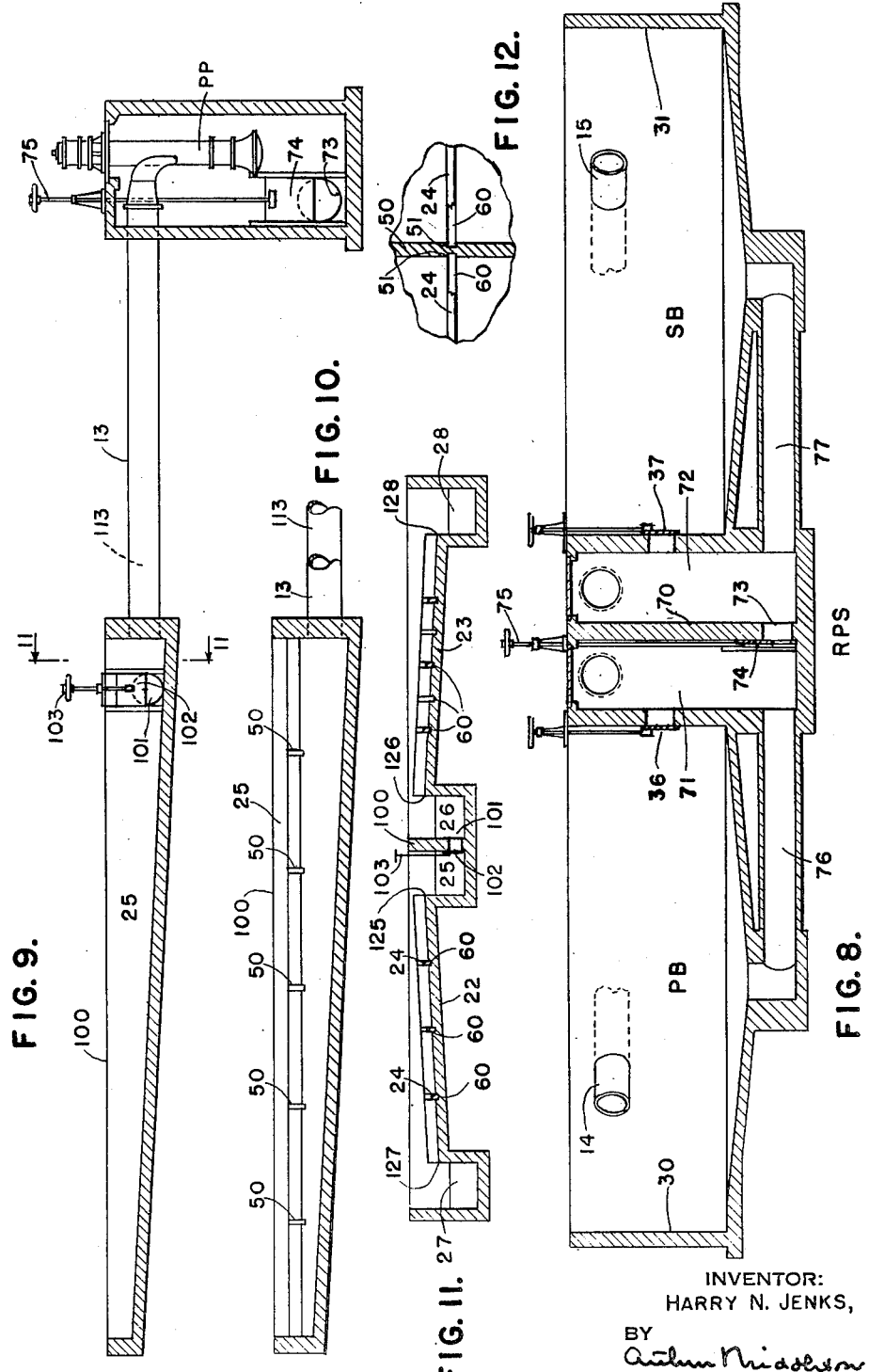
INVENTOR:
HARRY N. JENKS,
BY
Arthur Middleton
ATTORNEY Patented May 4, 1954

2,677,657

UNITED STATES PATENT OFFICE 2,677,657

TREATING OF SEWAGE OR OTHER POLLUTED LIQUIDS

Harry N. Jenks, Palo Alto, Calif.

Application February 5, 1952, Serial No. 270,001

11 Claims. (Cl. 210—8)

This invention relates to the clarification and purification of sewage, trade and other polluted waste liquids, and more particularly relates to such treatment by the use of what is generally known as the activated sludge system. In such a continuous system the sewage or other waste is usually first subjected to primary settling to remove settleable solids, whereupon the effluent from the settler is passed to tanks, called aerators, where the liquid is subjected to diffused air which encourages the formation of activated sludge. Liquid from the aerators goes into a secondary or final settler where activated sludge resulting from such aeration is removed from the liquid and returned to the aerators. The effluent liquid from the secondary settler has thus been both clarified and purified, that is, depurated. Sludge from both the primary and secondary settlers is then usually digested or otherwise disposed of.

The invention hereof comprises an improvement on or constitutes an improvement over such a system, which is rather expensive because of the complex structures; because of the expense of the requisite equipment; and because of operating expense. So it is an object of this invention to devise a substitute system that significantly overcomes those disadvantages, and yet retains at least most of the advantages of such a system.

In activated sludge systems that are common today, three highly essential functions are carried out in the standard aeration tank, namely, detention, mixing and aeration. It is an object of this invention to divorce the aeration zone from the detention and mixing station but having it in closed circuit therewith so that the oxygen-demand of the detention and mixing station is controllably satisfied by the divorced aerator to accomplish the aeration under better controlled and more efficient conditions. Another object of this invention is to practice these divorced steps of detention and mixing on the one hand and of aeration on the other hand, on a hydraulic basis for the most efficient absorption and utilization of atmospheric oxygen with consequent economy of power input.

Another object is to devise an improved aerator that does not need diffused air except under very low pressure, but uses more natural processes. A further object is to combine with such an aerator a particular kind of vortical mixing and detention station which has means for controlling the vortices therein, as well as for otherwise integrating them with the purification process. And another object of the invention is to devise both ways and means for producing activated sludge in a simpler and more efficient manner, while being capable of embodiment in a more attractive and esthetic sewage treatment plant.

One of the features of this invention lies in the new type or arrangement of aerator that receives the mixture of sludge and liquid from a particular detention and mixing station; and returns it to the tanks of that station after aeration. Its characteristics are abrupt changes in velocity of flow with the horizontal component of the distance travelled being greatly in excess of the vertical component of that distance, thus insuring the minimum loss of head through the system per unit of atmospheric oxygen absorption; and recirculation is practiced as this is economically feasible by virtue of this restricted loss of head.

So for aeration by this invention, dependence is primarily on an inclined plane to induce aeration by simple streamflow. This aeration is fundamentally by virtue of velocity of flow rather than free fall. In relatively thin sheets, the velocity of flow induces rapid turnover of the liquid and exposure of all portions thereof to the atmosphere. This intrinsic characteristic of flow is further augmented in this invention by the provision of suitable obstructions on the inclined deck along which the stream flows, to induce hydraulic jumps and wave action. Great turbulence and air entrainment occurs with little loss of head; the velocity-head being converted into static head at each jump at relatively high hydraulic efficiency, and the overturning of the liquid with its consequent exposure to free air for absorption thereof, all with the least drop in elevation of the liquid. This makes possible the recirculation of very large volumes of liquid over such a deck aerator with relatively little expenditure of power. Stated differently, the loss-of-head through the hydraulic jump of this invention is less than that resulting from a series of free falls, for the same degree of turbulence and aeration.

Another feature of the invention lies in the place or station for holding and mixing from which liquid and sludge in admixture are passed to the aerator and returned, and which comprises two sequential continuously vortically rotating or swirling bodies of such mixture of substantially equal size, into the peripheral portion of which any incoming liquid is submergedly and generally tangentially delivered. As to the swirling bodies, one may rotate at a speed greater than the other. The bodies are hydraulically communicating by means of a flow connection from the lower portion of each to a riser that tangentially delivers liquid back to each body and a different vortex-inducing speed.

And another feature of this invention is that the wastes being treated can be freely recirculated between the detention-mixing zone and a separate and independent aeration zone at a rate adjustable to the securing of a balance between the biologic oxygen demand (B. O. D.) of the liquid in the detention-mixing zone, and the oxygen replenishment in the aeration zone. By the significantly slight loss-of-head of liquid being circulated in the treatment plant of this invention, it takes only a fraction of the horsepower consumed in competitive plants on the basis of millions of gallons treated per day, or even on the basis of pounds of B. O. D. removal per kilowatt-hour. On the former basis, tests of this invention have shown a power consumption of only 10 H. P. per million gallons, and on the latter basis 10 pounds per kilowatt-hour. These are both one-fifth of standard power consumption. Yet for this low power consumption, the entire contents of the holding-mixing zone can be brought into contact with the atmospheric air supply in the aeration zone as often as every ten minutes or at least between ten and thirty minutes, which is phenomenal. This makes it possible for the plant to absorb shock loads quite readily.

These objects can be realized, and these features made use of, in an activated sludge-producing plant to which polluted liquid or sewage is fed and from a sedimentation station of which there is discharged activated sludge along one path and along another path depurated liquid, where such plant has (1) a detention and mixing station including a primary and a secondary substantially cylindrical body of such sewage substantially equal in size and hydraulically connected, from which bodies sewage is pumped jointly while delivering a quantity of such pumped sewage to each body at different vortex-inducing speeds; (2) a multiple cascading aerating station receiving sewage from each of the bodies and have a horizontal channel from which sewage flows downwardly along an inclined deck provided with devices for inducing thereon alternate cascades and plateaus of sewage gravity-delivered to a collecting channel; and (3) flowpaths for conducting sewage from the bottom section of the detention and mixing station to the aerating station as well as from the bottom section of the secondary body to the sedimentation station. Further features of novelty are to be found in details of construction and of operation of at least some of the foregoing stations, as will appear as this specification proceeds.

As this invention may be embodied in several forms without departing from the spirit or essential characteristics thereof, the present embodiments are illustrative and not restrictive, since the scope of the invention is defined by the appended claims rather than by the description preceding them, and all changes that fall within the metes and bounds of the claims, or of equivalents of such metes and bounds, therefore intended to be embraced by those claims.

The object of this invention hereof can be realized in and by a plant embodying the features of construction shown in and diagrammatically illustrated by the drawings accompanying this specification. In this specification and in the descriptive portion thereof the parts are given specific names for ready identification and are particularly or specifically referred to in the claims but these terms are intended to be broadly construed, as is justifiable by the art to which they relate and in which they are employed.

To that end, the invention is illustrated in the accompanying drawings wherein:

In said drawings, Fig. 1 is a diagrammatic type of flowsheet, with certain parts in vertical section, of an entire treating plant in which this invention is embodied, but particularly showing the flow relationship of the detention and mixing station to the aerating station and their relationship to other parts of the apparatus in such a plant.

Figure 3:
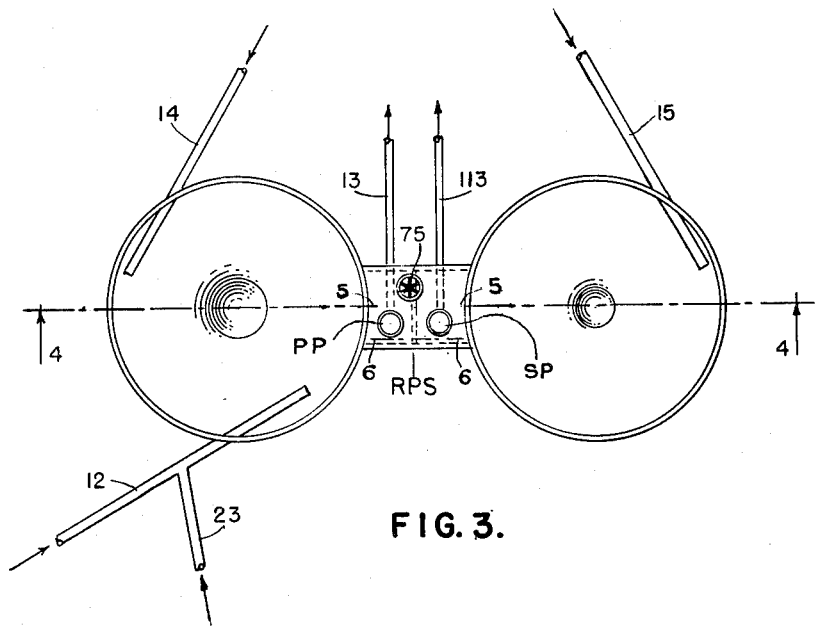
Fig. 3 is a plan view illustrative of the detention and mixing station.
Figure 4:
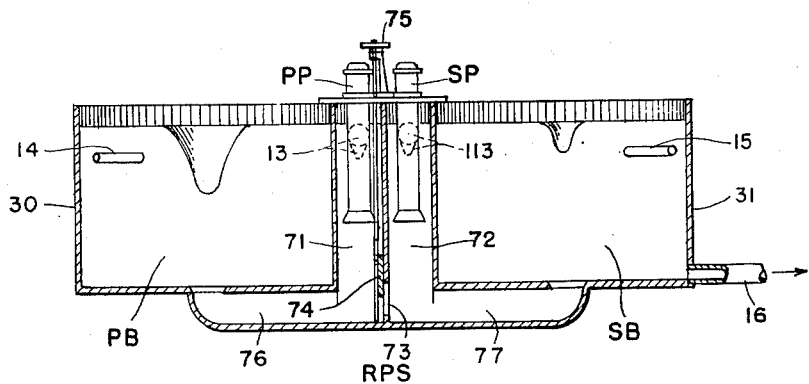

Fig. 4 is a showing of which the lower half is a vertical sectional view taken as on a vertical plane determined by the lines 4—4 of Fig. 3, while the upper half is a vertical sectional view taken as on two vertical planes indicated by lines 4—5, 6—6 and 5—4, looking in the direction of the arrows. In other words, the lower half of Fig. 4 shows the flow arrangements determined by the low conduit section leading from the primary detention tank to the corresponding pump containing section and the conduit leading from the secondary detention tank to the secondary pump containing section, while the upper portion of this detention and mixing station is illustrative of the primary and secondary pump containing sections taken at a locality whereat the pumps for these sections are shown in full.

Fig. 5 is illustrative of a portion of the cascading deck of the aerating station; it is a partial isometric view thereof.

Fig. 6 shows a detail of the air-enfolding back-flow section 56 of Fig. 5, but on a somewhat larger scale than the corresponding portion of Fig. 5.

Fig. 7 is an isometric view of the recirculating pump station structure, parts of which are broken away to bring out certain structural features thereof and according to which there are provided primary and secondary pump receiving sections structurally separated from each other through the medium of a vertically-extending dividing partition having a gateway or positionable gate controlled transverse flow passage opening leading from the primary pump containing section into the secondary pump containing section and also in which station there are indicated the primary and secondary pumps located in the respective pump containing sections to which they correspond.

Fig. 8 is a vertical transverse sectional view of the detaining and mixing station and particularly illustrating in cross-section and serial arrangement the primary detaining and mixing tank, the recirculating pump station, the secondary detaining and mixing tank and flow conduits to, of, between and from the parts just mentioned.

Figure 2:
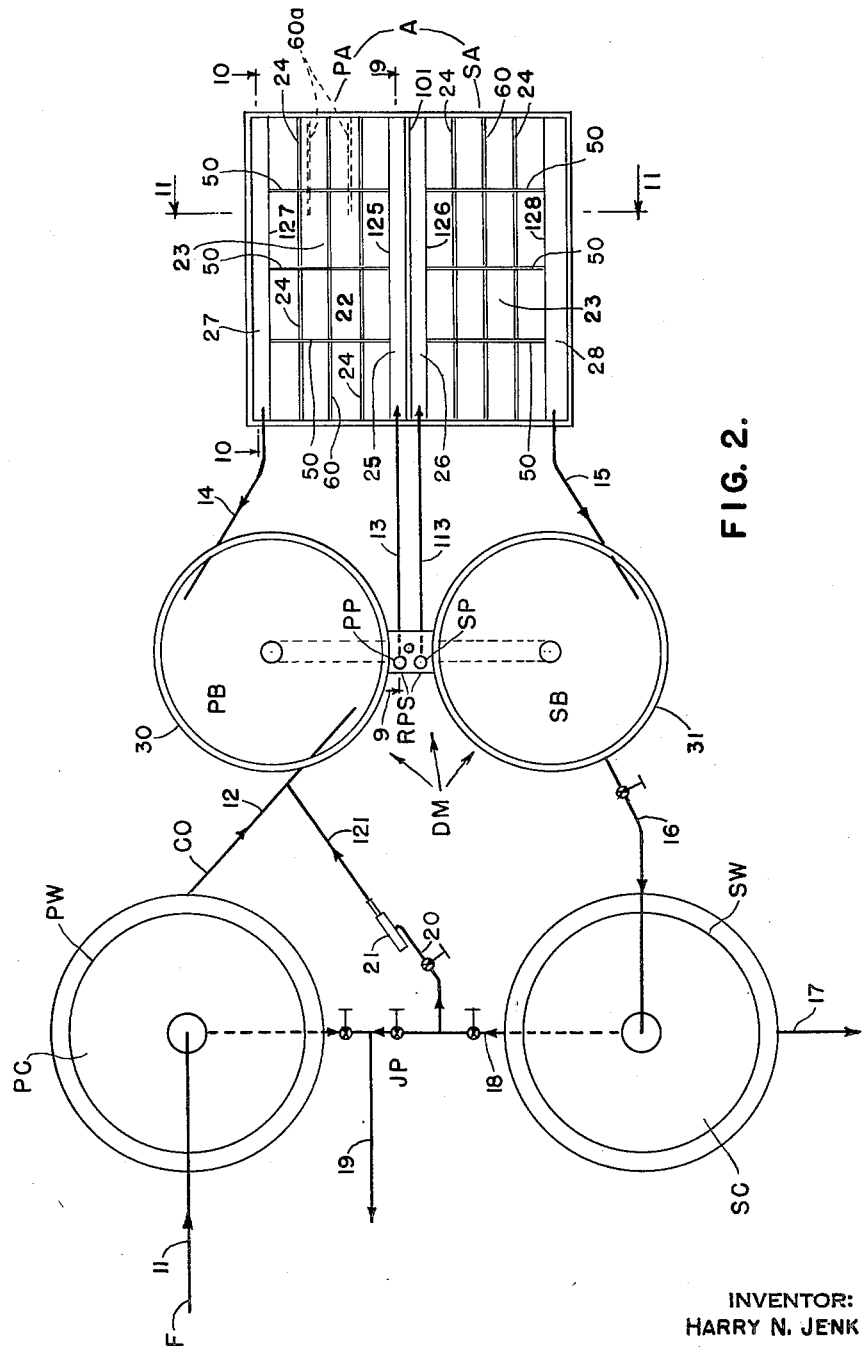
Fig. 2 is a plan view diagrammatically illustrating one form of embodiment of a plant which is typified by Fig. 1.

Fig. 9 is a vertical longitudinal section taken on a vertical plane indicated by the dot-and-dash line 9—9 of Fig. 2 or of Fig. 11 looking in the direction of the arrows 9—9; in this Fig. 9 the parts are shown in somewhat greater detail and on a larger scale than in the showing of Fig. 2.

Fig. 10 is a vertical longitudinal sectional view taken as on the plane 10—10 of Fig. 2 looking in the direction of the arrows 10—10 of Fig. 2; in this figure, as in the case of Fig. 9, the parts are shown in somewhat greater detail and on a somewhat larger scale than in Fig. 2.

Fig. 11 is a cross-sectional view taken on the vertical plane indicated by line 11—11 of Fig. 2 looking in the direction of the arrows 11—11; this cross-sectional view is also located as to its position by the line 11—11 of Fig. 9 looking in the direction of the arrows 11—11 of that figure.

Fig. 12 is a plan view of a detail of construction respecting a longitudinally-extending downflow guiding partition and longitudinally-extending flow obstruction members or jump baffles located between and reaching into grooved portions of the downflow guiding members; said flow obstructing or baffle members are spacedly disposed with respect to each other and they are also preferably installed whereby they can by spacedly positioned with respect to each other according to operation requirements, as will hereinafter appear.

Reference is now made to the drawings in detail. Like reference characters are employed to indicate like parts on other like-functioning parts throughout this specification.

REGARDING THE PLANT DIAGRAMMATICALLY ILLUSTRATED BY FIGS. 1 AND 2

The plant of these figures is shown more or less generally and symbolically and is indicative of a style and character designed and suitable for the treating of polluted waste, such as sewage and trade wastes.

In the drawings the letters PC indicate a primary clarifier, settler or sedimentation tank of a well-known type—to wit, identifiable as a Dorr raking type of sedimentation tank; SC indicates a secondary clarifier or final sedimentation tank which may be of the same general type.

DM indicates a detention and mixing station following generally the teaching of my Patent 2,589,261, of March 18, 1952, which is hereinafter described in more detail. This station DM receives as feed material sewage or other organic polluted waste passed thereto as clarified liquid from the primary clarifier into a primary body PB in the primary cylindrical tank 30 of the station DM. This station also includes as part thereof a secondary cylindrical tank 31 wherein there is received and detained a secondary body of liquid SB. This detaining and mixing station also has structurally and functionally associated with the primary and secondary sections thereof, as provided by the cylindrical tanks 30 and 31 just mentioned, a recirculating pump station or structure RPS providing primary and secondary pump-containing sections 71 and 72, of which the primary section 71 is in hydraulic flow communication through the medium of a primary suction flow conduit 76 leading thereinto from within the lower interior portion of the primary tank 30, and of which the secondary section 72 is in hydraulic flow communication through the medium of a secondary suction flow conduit 77 leading thereinto from within the lower interior portion of the secondary tank 31. In the plant there is an aerating station A providing a primary aerating section PA thereof and a secondary aerating section SA thereof. In the plant there is a primary pump PP in the primary pump-containing section 71, which pump has a pump flow delivery, conduit or connection 13 leading to a high liquid-distributing trough 25 of the primary aerating section PA; and there is a secondary pump SP in the secondary pump-containing section 72, which pump has a pump flow delivery conduit or connection 113 leading to a liquid receiving and distributing trough 26 of the secondary aerating section SA; also in said plant there is a flow return conduit 14 leading from a low collecting launder 27 of the primary section PA and backwardly into the primary tank 30 and in which there is a corresponding flow return conduit 15 leading from a low collecting launder 28 of the secondary section SA and backwardly into the secondary tank 31. There is also shown in connection with said plant a displaced liquid transfer pipe 16 in constant hydraulic communication with and leading from a submerged location within the secondary tank 31 to and into a submerged location within the secondary clarifier SC; and there is a valve controlled activated sludge transfer pipe 18 leading from the secondary clarifier SC to a valve controlled branch line 20 thence to a pump 21 all of which is provided for selectively passing aerated sludge—activated sludge—as from the secondary clarifier SC into the primary body PB in the primary tank 30 by way of line 121 and feed line 12. The piping arrangement is such that one can optionally and selectively pass undue accumulations of activated sludge from the secondary clarifier SC to a location for disposal thereof outside of the plant. In connection with the foregoing it will be noted that the secondary clarifier SC embodies an overflow weir element SW that establishes the normal operative level for the liquid undergoing sedimentation in the secondary clarifier and for in turn indirectly establishing the operative level of the liquid being detained and undergoing a mixing operation in the secondary tank 31 and also in the primary tank 30. In the plant thus diagrammatically outlined there is provided a raw sludge discharge conduit 19 for optionally passing from the primary clarifier PC sedimented raw sludge RS derived therefrom and for disposal to a locality outside of the plant, as will hereinafter more fully appear.

The several parts just referred to and the modus operandi thereof as the plant functions will now be described in detail.

1. *The primary clarifier PC*

This primary clarifier PC receives from source F as through line 11 sewage or other polluted organic waste to be initially settled therein. Its function is to early eliminate settleable solids which in general comprise settleable inorganic material but which may include entrained therein a quantity of settleable organic fractions. The settleable material derived by this early operation is collected as sludge and may be passed as raw sludge RS for disposal along a valve-controlled sludge discharge line 19 to a region outside of the plant or to a sludge digester (not shown) for accomplishing a biologic digestion of any putrescible organic material therein. The resulting accumulating supernatant of the initial settling may pass a weir PW as overflowed clarified feed material CO which continues to contain putrescible organics therein and which is delivered by and along a feed line 12 into a primary body PB that is detained while being swirlably mixed within the primary detention and mixing tank 30 of the detention and mixing station DM.

2. *The detention and mixing station DM*

This station includes the primary detention and mixing tank 30 in which the primary body PB of liquid is detained and mixed while being swirled and also the secondary detention and mixing tank 31 in which the secondary body SB of liquid is detained and mixed while being swirled. The detention tanks 30 and 31 have structurally connected therewith — or at least have functionally and operatively associated therewith — the aforementioned recirculating pump station or structure RPS.

3. *Recirculating pump station RPS and primary and secondary pumps PP and SP thereof*

In connection with the foregoing it will be noted that this station is provided within a hollow box-like structure, the interior of which is divided by an upwardly-extending partition 70 into a primary pump-containing section 71 and a secondary pump-containing section 72. In the primary section 71 there is located a primary suction and pressure-delivery pump PP and in the secondary section 72 there is located a secondary suction and pressure-delivery pump SP. Through the upwardly-extending dividing partition 70 there is a low transfer area or flow passage opening 73 leading from the pump-containing section 71 into the pump-containing section 72. There is a positionable gate or valve 74 for regulating the effective flow area of said opening 73 and there is a hand-operated means or valve rod 75 for positioning said valve or gate 74 for regulating the effective flow area of said opening 73. The primary purpose and utility of this valve-controlled opening 73 will later be described. A primary suction flow conduit 76 leads from a low central portion of primary tank 30 and is provided for conveying suction-pumped liquid from the interior of the primary detention and mixing tank 30 and for delivering the thus sucked liquid into the lower interior portion of the primary pump-containing section 71. Likewise a secondary suction flow conduit 77 leads from the low central portion of the secondary detention and mixing tank 31 and delivers suction-pumped liquid from said tank 31 into the lower interior portion of the secondary pump-containing section 72. The primary pump PP has as aforementioned, a discharge conduit 13 leading therefrom to and for delivering pressure-pumped liquid into a pumped-liquid receiving and distributing trough 25 at and along the high overflow edge portion 125 of the deck 22 of a primary section PA of the aerator A and the secondary pump SP has as aforementioned, a discharge conduit 113 leading therefrom to and for delivering pressure-pumped liquid into a pumped-liquid receiving and distributing trough 26 at and along the high overflow edge portion 126 of the deck 23 of a secondary section SA of the aerator A.

4. *Aerator A having a primary aerating section PA and a secondary aerating section SA*

In and for each of the aerating sections just mentioned there is a downwardly sloping deck—to wit: deck 22 for the primary aerating section PA and deck 23 for the secondary aerating section SA. The deck 22 of the primary section PA is provided with the aforementioned pumped-liquid receiving and distributing trough 25 at and along the high overflow edge portion 125 of the deck 22 and which receives the pressure-pumped liquid from the aforementioned delivery pipe or conduit 13, and the deck 23 of the secondary section SA is provided with the aforementioned pumped-liquid receiving and distributing trough 26 at and along the high overflow edge portion 126 of the deck 23 and which receives the pressure-pumped liquid from the aforementioned delivery pipe or conduit 113. Also the deck 22 of the primary section PA is provided with a liquid collecting launder 27 which is disposed at and along the low discharge edge portion 127 of said deck 22, and the deck 23 of the secondary section SA is provided with a liquid collecting launder 28 which is disposed at and along the low discharge edge portion 128 of said deck 23. Also in the aerator structure A there is provided a vertically and longitudinally-extending dividing member 100 which structurally separates the primary aerating section PA from the secondary aerating section SA, except as through a flow transfer opening 101 controllable as to flow area therefrom through the medium of a valve or gate 102, positionable as by rod 103; the parts just referred to are clearly shown in Figs. 9 and 11. This aerator will be subsequently described in detail as to its construction and as to the aerating functions realized thereby or accomplished thereupon.

5. *Aerated liquid primary return conduit 14 and secondary return conduit 15*

The conduits just referred to under this heading respectively lead as follows: conduit 14 leads from the aerated liquid collecting launder 27 of the primary aerating section PA of the aerator A back into the primary detaining and mixing tank 30 and is disposed for submergedly delivering the liquid passing therefrom in a direction to further a counterclockwise swirling movement to the primary body PB of liquid detained and constantly swirling in counterclockwise direction within that tank. Conduit 15 leads from the aerated liquid collecting launder 28 of the secondary aerating section SA to the aerator A back into the secondary detaining and mixing tank 31 and is disposed for submergedly delivering the liquid passing therefrom in a direction to further the clockwise swirling movement in the secondary body SB of liquid detained and constantly swirling in clockwise direction within that tank.

6. *Functioning of the recirculating pump section RPS and the primary and secondary pumps PP and SP therein*

The structure of this section has been previously referred to and described and, as indicated, it is divided by an upwardly-extending partition 70 into a primary pump-containing section 71 and a secondary pump-containing section 72. While such sections are structurally separated and divided by the partition just referred to, it will be noted that they are in relatively restricted communication through the medium of the transverse flow passageway 73 that is regulated as to flow area through the medium of the valve member or gate 74 which is positionable as by the hand adjustable valve rod 75. This gate controlled passageway is preferably disposed at or near but through the low end portion of the partition 70. The recirculating pump structure RPS is preferably located intermediate the primary and secondary tanks 30 and 31 and also preferably so located as to constitute part of the larger structure that includes and provides the primary and secondary detaining and mixing tanks 30 and 31 of the detaining and mixing station DM. Furthermore there is provided the aforementioned low flow conduit 76 leading from the low central portion of the primary detention and mixing tank and structurally disposed for delivering the suction-pumped liquid into the low interior portion of the primary pump-containing section 71 of the recirculating station. Similarly there is a low flow conduit section 77 leading from the low central portion of the secondary detention and mixing tank 31 and structurally disposed for delivering suction-pumped liquid into the low interior portion of the secondary pump-containing section of the recirculating pump station while the pumps PP and SP in their normal operation function to suck liquid from the low portion of the primary and secondary mixing and detaining tanks 30 and 31 and deliver the lifted pumped liquid under pressure through the respective conduits 13 and 113 into the corresponding pumped-liquid receiving conduits 25 and 26 of the primary and secondary aerating sections PA and SA of the aerator A. It will be noted, however, that as the primary pump PP functions it serves to repetitively, cyclically and successively pump liquid from the primary tank 30 into the pump-containing section 71 and to deliver the pressure-pumped liquid from that section into the primary aerating section PA over and past the deck 22 thereof and whereby there is a return of the aerated liquid through conduit 14 and subsequent submergedly deliver it into the primary tank 30, in a direction to further a continued swirling motion of the primary body PB in the tank 30, likewise in a similar manner the secondary pump SP in the recirculating pump stations RPS functions to repetitively, cyclically and successively pump liquid from the secondary tank 31 into the pump-containing section 72 and to deliver the pressure-pumped liquid from that section into the secondary aeration section SA over and past the deck 23 thereof and whereby there is a return of the aerated liquid through conduit 15 and subsequent submergedly deliver it into the secondary tank 31, in a direction to further a continued swirling motion of the secondary body SB in the tank 31. At this juncture, however, it will be pointed out that incoming feed into the primary detaining and mixing tank 30 displaces a corresponding quantity of liquid from the primary cycling section as through passage area 73 into the secondary cycling section and an ultimate consequent displacement of a corresponding quantity of liquid from the secondary detention and mixing tank 31, to wit, as through line 16 leading therefrom and finally as overflowed effluent from the secondary clarifier SC.

7. *Secondary clarifier SC*

The plant as installed also has the secondary clarifier SC, just referred to. This clarifier is constantly in hydraulic connection with the interior of the secondary tank 31 of the detention and mixing station DM through the medium of a pipe 16. This pipe 16 leads from a submerged location within the interior of the tank 31 to a central feed well section within the secondary clarifier SC. Said secondary clarifier has an effluent overflow weir SW that determines the elevation not only of the surface level of the liquid within the clarifier SC but also indirectly the general surface elevation of the bodies of liquid that are being detained and mixed or swirled within the respective tanks 30 and 31. The secondary clarifier SC is preferably equipped with some type of raking mechanism such as provided by the Dorr type of rakes R that are actuatable about a central axis for imparting an impelled and inward transferring movement to sedimented material derivable from the liquid within that tank—to wit, derivable material identifiable as activated sludge. The effluent passing the effluent weir SW is in fact that which may be properly referred to and called clarified and purified effluent or depurated effluent of a character which can be delivered or safely discharged from the system. The material or sludge which is received in the sump or depressed central portion of the secondary clarifier SC is in fact activated sludge derived from the treatment operations repetitively and successively cyclically carried out (a) in the primary detention tank 30 and the primary aerating section PA and (b) in the treatment operations subsequently but repetitively and successively cyclically carried out in the second detention and mixing tank 31 and in the secondary aerating section SA—and according to operating steps in which as incoming feed is delivered continuously or at spaced periods of time into the primary tank 30 there follows a corresponding consequent transfer of displaced liquid from the primary body PB of liquid being recycled, thence as through passage area 73 of the recirculating pump station RPS into the secondary body of liquid being recycled and therefrom in corresponding consequent quantity through the pipe 16 into the secondary clarifier SC, from whence there likewise passes a like displaced quantity of supernatant liquid which outflows as clarified and depurated liquid and as final plant effluent.

8. *Collecting and using or disposing of excess quantities of activated sludge AS or of raw sludge RS*

The activated floc particles derived from the treatment operations above referred to gravitate and settle as sludge within the lower portion of the secondary clarifier SC. Rakes R within the latter are employed to progressively convey and impel the settled sludge—which is activated sludge AS—towards the sump or depressed portion of the floor of the secondary clarifier SC wherein the activated sludge is collected and then controllably conveyed, as by gravity flow or pumping, therefrom through valved pipe 18 towards and into a pipe junction point JP having a valve-controlled branch 20 leading to a pump 21 and thereby through a delivery pipe section 121 leading to and into the feed line 12 by which the thus transferred activated sludge is submergedly delivered into the primary body PB within the tank 30, to wit: in a direction favorable to a continued counterclockwise flow or swirling motion of the primary body PB of liquid within the tank 30. The activated sludge AS, or that quantity thereof which is thusly delivered into the primary tank 30, serves as a biologic seeding material to further and support the aerobic biologic actions carried out within the primary body PB undergoing treatment within the tank 30 and the parts associated with that tank.

At this juncture it should be noted that the primary clarifier PC has a valve-controlled pipeline leading therefrom by which raw sludge RS collecting as raked material transferred into the depressed portion of the primary clarifier PC can be passed either to waste or, if otherwise selected, into a digestion tank that may be employed and wherein that raw sludge can be subjected to biologic digestion, assuming that it contains putrescible organic material therein. Similarly that portion of the pipeline 18 leading beyond the junction point JP and which has a control valve 17 therein can be used to pass an excess quantity of activated sludge derived from the secondary clarifier SC to waste through the sludge discharge line 19 or, if otherwise selected, to a biologic sludge digestion apparatus (not shown) and which can be employed for digesting therein putrescible organic sludge providing material.

9. *Detailed construction of aerator A*

Figure 1:
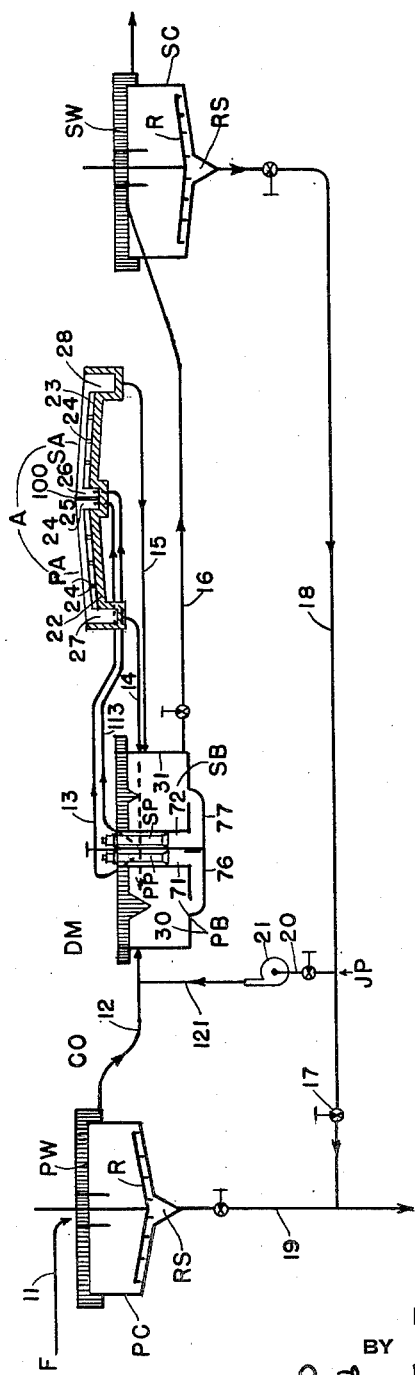

Further, and more particularly in reference to the construction details and functioning of this station, there is illustrated in and by a transverse cross-sectional view appearing in Fig. 1 and by a plan view appearing in Fig. 2 and on a larger scale in a vertical downflow section illustrated by a perspective and partial isometric view of Fig. 5 a cascading stricture typifying a novel form of construction for employment in and as part of an aerating station. Also in a region indicated by circle 6 of Fig. 5 there is illustrated by Fig. 6 a free cascading typifying example for the movement of liquid relative to the oxygen-supplying air realizable or attainable at that particular location. In addition to the illustrated typifying example shown by Figs. 5 and 6, the details of construction of the aerator A and the primary and secondary sections PA and SA thereof are brought out in a completing manner by Figs. 1 and 2, particularly when considered in conjunction with the showing in Figs. 9 to 12 inclusive.

In Figs. 1 and 2 taken in conjunction with Figs. 9, 10 and 11, it will be noted that the primary section PA of the aerator is structurally divided and functionally separated from the secondary section SA by the vertically and longitudinally-extending partition member 100 except that at the deep or liquid-receiving end of the aerator A there is provided a transverse flow passageway 101 through the dividing partition member 100. This transverse flow passageway 101 is controlled as to the effective flow area therefrom by a gate or valve 102 which is positionable by the hand-controlled member 103 (see Figs. 9 and 11). In Figs. 1 and 2 it will be seen that the dividing partition 100 functionally separates the primary and secondary pumped-liquid receiving and distributing troughs respectively numbered 25 and 26, except as to the transverse flow area provided by the opening 100, and which cross-flow area is determined as to size by the adjustable gate or valve 102. As to the elevation of the upper edge of the marginal wall of the aerator and of the dividing partition 100, this is preferably somewhat higher than that of the upper margin of the primary and secondary detention and mixing tanks 30 and 31.

The general elevation of the pumped-liquid receiving and distributing troughs of the aerating means is such that the upper boundaries thereof may be as low as three or four feet above the normal liquid level maintained within the primary and secondary tanks of the detention and mixing station and thusly the recirculating pumps PP and SP in the recirculating pump station RPS are not operated at a large delivery pressure but afford a relatively tremendous flow delivery of recirculated liquid at a low pressure head. Each of the aeration sections is provided with a descending deck of appropriate slope of only one to five feet per hundred.

In connection with the aerating sections referred to there are provided, for example, transversely-extending downflow guiding members 50 extending downwardly from the liquid distributing trough, as 25 or 26, and reaching to the corresponding effluent receiving launder, as 27 or 28. There are also provided transversely-extending and upwardly-directed but relatively shallow overflow baffle members 24 provided as by transverse or cross-flow strips rising as from longitudinally-extending groove portions 60 in the inclined deck. These riser strips or cross-flow members function as overflow members or flow-obstructing baffles for compelling cascading waterfall effects on the water encountering and passing the same. In the detail showing of Fig. 12 it will be noted that the downflow guiding members 50 are provided with vertically-extending notches as 51 for receiving the adjacent end portions of the overflow baffle members 24.

Now with further and more particular reference to the construction of the aerating station A looking at Fig. 5, it will be seen that baffles or weirs 24 are placed upstandingly on the upper side of the inclined deck so that sewage, or other polluted liquid, flowing down the incline is caused to cascade at 54 as it flows or falls over the baffles more or less like a small water-fall. But on the upstream side of the baffle, there is formed a transversely-extending plateau 55 of highly turbulent sewage that has on its upstream face or limit an air-enfolding rotary or eddying section 56, descendingly rolling about a substantially horizontal axis. In other words, the sewage curls downwardly on the upstream limit or edge of the plateau in what seems to be or at least looks like another aerating water-fall but in reverse direction to the water-fall 54 over the baffle 24. Fig. 6 is shown with a view to giving some idea of this phenomenon. Sewage from the plateau curls or swirls downwardly at 56 from the top of the plateau 55, and tends to fold itself (along with air shown in the drawing by small circles) in at the bottom where it merges with the sheet of sewage flowing thereto from upstream on the inclined deck. Between the plateau areas 55 of highly turbulent aerated sewage are depressed areas or sheets 57 of rapidly running sewage. Each plateau area terminates on its downstream side in a cascade or water-fall over the baffle 24, while it terminates on its upstream side in a rotary or folding-in cascade or water-fall, descending onto and merging into the adjacent upstream depressed area 57. However, in order to realize this type of cascading flow with alternate plateau and depressed areas, as well as an air-enfolding downflow at the upstream limit of each plateau, it is necessary to observe certain important limitations or critical requirements of the angle of inclination of the inclined deck, and of the distance apart the baffle means are placed. That is, the inclination or slope of the inclined deck or decks should be in a range of 2% to 5% or, stated in another way, the slope should be from 2 feet per 100, to 5 feet per 100. At whatever slope used that is within this range, the jump baffles 24 must be located apart so that the upstream limit of one plateau 55 does not extend into the next upstream cascade 54 but allows a depressed sheet of sewage to exist between the upstream limit of the plateau and its next adjacent upstream cascade. In other words, there must be no ponding upstream of the jump-baffle that reaches into the next upstream cascade, for otherwise the full air-absorbing and entraining effect of the cascade is lost, and so is the air-enfolding effect of the rotary upstream limit of the plateau if it interferes, or rather is interfered with, by the next upper cascade. So it is important that the cascade and its next downstream rotary limit of the plateau be kept apart with a depressed sheet of sewage maintained rapidly flowing therebetween.

Another important requirement of this type of aerating station is that enough sewage must be maintained in motion through it. To that end, the total feed supply going to the aerating station through the conduits 13 and 113 from the detention and mixing station DM must be in quantity equal to at least 10:1 of the quantity of sewage incoming to the plant into primary clarifier PC, with an upper limit of about 30:1. Another way of measuring this is to say that the total flow over the inclined deck of the aerating station should lie in a range of from 5 to 15 gallons per minute per square foot of submerged deck surface area.

In operation, this new type of activated sludge-producing sewage treatment plant, without the use of diffused air, has depurated sewage, namely clarified effluent from primary clarifier PC overflow CO therefrom to be supplied to the detention and mixing station DM by being supplied through conduit 12 generally tangentially to primary body PB of that station to set up in that station a vortex-inducing swirl. Sewage is passed by pumping means from the primary and secondary bodies of the detention and mixing station DM and thence through suitable piping to and into receiving troughs or channels 25 and 26 of the aerating station A. Sewage then flows down the inclined decks 22 and 23 over the jump-baffles 24 and are aerated as described heretofore, whereupon the serated sewage is collected in launders 27 and 28 to be returned through conduits 14 and 15 tangentially to the swirling bodies of sewage in the detention and mixing station. Then sewage from the secondary body SB in secondary tank 31 flows preferably by gravity to the secondary clarifier or sedimentation tank SC wherein activated sludge settles and from which stabilized purified (depurated) effluent PE is released as overflow through conduit 17. The activated sludge is released as underflow through conduit 18 and of which some is to be returned through conduit sections 18 and 20 by pump 21 and conduit section 121 to the detention and mixing station. The plant construction shown is such that activated sludge AS of the secondary clarifier SC, or raw sludge RS of the primary clarifier can be optionally passed to waste or for further treatment if desired.

Activated sludge is produced as a result of the conjoint action of the sewage by the detention and mixing station DM and the aerating station A. Sewage is purified by living organisms, generally referred to as bacteria that are aerobic, since they must have ample air to go through their life processes. They live by consuming the putrescible biologic oxygen demanding matter in the sewage and their end products are purified liquid and solids that take the form of activated sludge. So it is a major problem in any activated sludge producing plant to provide and maintain an ample supply of air in the sewage so the sludge-producing organisms can thrive and do their sludge producing work effectively. Heretofore, this air was supplied by diffusing air through porous tiles in an aerating tank where some of the air became dissolved and some entrained in the sewage. But by the practice of this invention, the air seems to be highly effectively absorbed by the sewage in the aerating station apparently due to its magnified repetitive air-enfolding action. So the sewage returned to the detention and mixing station is rich in its air content.

In that latter station, more air seems to be sucked into the swirling sewage through the vortices in the primary and secondary bodies of that station, and at the same time the air-bearing sewage is moved actively so that the bacteria get all the air they need to live and work. So the mixing action of this station is highly important both due to its swirling action and due to the mingling back and forth of sewage between the two bodies as a result of the pump P drawing sewage from both bodies through the communicating risers 71 and 72 and delivering this in admixture back to both bodies, while at the same time some of the admixture is pumped through pipe 13 to the aerating station A. The degree of mixing and the extent of the vortices can be regulated in this type of detention and mixing station by adjustment of the outlet gates 36 and 37—although this station forms the subject matter of a patent application being currently filed. The detention time of this station is controlled by the size of the tanks correlated to the quantity of sewage flowed through them.

Now assuming that the plant has been previously dosed and put through a series of steps or functioning operations to bring it into condition for normal functioning and operation thereof, then it is in order at this juncture to point out that certain steps will from time to time be required to be performed or employed to maintain the plant in its most effective and efficient mode of operation and to that end there is from time to time introduced as a dosing agent a quantity of aerated sludge derived from a subsequent portion of the process, to wit: as from the secondary clarifier SC, and delivered into incoming feed en route to the primary detention and mixing tank 30. The thus provided seed material functions as such in the presence of the organic material of the added sewage supplied for treatment and progresses as the desired purifying operation is carried out in the successive repetitive recycling, aerating and liquid detaining and mixing stages, as outlined herein.

By the practice of this invention and wherein the novel aerating means hereof is employed the air seems to be effectively absorbed by the sewage in the aerating station, apparently due to the magnified repetitive air-enfolding action obtained and realizable thereat, so that the sewage return to the detention and mixing station is rich in its air content. The structure of the aerating means as employed in this latter station is such that more air seems to be sucked into the swirling sewage through vortices in the primary and secondary bodies or sections of that station and at the same time the air-bearing sewage is moved actively so that the bacteria get all the air they need to live and work. The mixing action in this station is highly important due to the swirling action continued therein after the aeration has been effected upon the sewage in and by the aerating station. An important structural feature of the invention hereof is the new form of aerating means described herein and more particularly described under the heading as previously indicated, detailed construction of aerator A. Other features of the invention hereof also revolves about the repetitive circulation of the sewage undergoing treatment, firstly, in a primary section that includes in cyclic arrangement a primary detention and mixing tank 30 and a primary aeration section PA and thereafter, secondly, in a secondary portion of the plant that includes in cyclic arrangement a secondary detention and mixing tank 31 and a secondary aeration section SA of the type described.

Now, therefore, with regard to the construction of the sloping decks 22 and 23 of the aerating station A and also with reference to the showing in Fig. 5 of the drawings, it will be noted that the flow-obstructing baffles or rising strips or weirs thereof are each and all identified by the same reference character, to wit 24, and this statement applies whether the baffles or weirs are baffles or weirs of the primary aerating section PA or baffles or weirs of the secondary aerating section SA. All of these baffles or weirs are placed upstandingly on the upper side of the inclined deck kreferred to, so that sewage or polluted liquid flowing down the incline thereof is caused to cascade at 54 (see Figs. 5 and 6) as it flows or falls over the baffles or weirs more or less like a small waterfall. There may also be included a greater number of these grooves 69 whereby it may be feasible to relocate these flow-obstructing baffles or weirs 24 according to operating requirements for a particular aerating section and according to flow requirements or downflow directives as may be sought. An object of these obstructing baffles or overflow weirs 24 is to attain the desired cascading flow, as one may call it, of the liquid being aerated while flowing downwardly over an inclined deck and over the baffles or weirs thereof.

It has therefore been pointed out that there must be no ponding upstream of the jump baffle that reaches into the next upstream cascade, for otherwise much of the air-absorbing effect of the cascading is lost, and so is the air-absorbing effect of the rotary upstream of the plateau if it interferes—or rather is interfered with the next upper cascade. So it is important as previously indicated that the cascade and its next downstream rotary limit of the plateau be kept apart, with a depressed sheet of sewage maintained therebetween. Another important requirement of this type of aerating station is that enough sewage must be maintained in motion through it. To that end the total feed supply going to the aerating station from the conduits 13 and 113 from the detention and mixing station DM must be equal to at least ten to one of the quantity of sewage incoming to the plant into the primary clarifier OC, with an upper limit of about thirty to one. Another way of measuring this is to say that the total flow over the inclined decks of the aerating station A should lie in a range of five to fifteen gallons per minute per square foot of submerged deck surface area.

As previously indicated the elevation of the overflow edges of the pumped-liquid receiving and distributing troughs 25 and 26 may be as low as three feet above the upper overflow edge of the primary and secondary tanks 30 and 31 of the detaining and mixing station DM. The result of this arrangement is such that the pumps do not have to pump against a large static head, but they are required to deliver a large quantity of pumped liquid at relatively high rates to cause the cascading lateral flow down the inclined decks of the primary and secondary aerating sections PA and SA whereby the resulting cascading operation and aerating will be realized.

Transversely spaced longitudinally extending grooved portions or notches such as indicated as 60a of Fig. 2 may be provided to permit alternate locations of the shallow flow obstructing baffles 24 in order to obtain a particular sought for overflow effect.

With respect to the circulating pump station PRS and the primary and secondary pumps PP and SP thereof, there is illustrated in any by the perspective view of Fig. 7 a box-like formation or structure of which certain parts have been broken away and left uncovered in order to bring out typifying locations of the parts thereof and of the connection of the pumps PP and SP and the outflow conduits 13 and 113 extending therefrom. These conduits are indicated as being embedded in or structurally connected to the upright walls of the box-like structure and as also as providing supporting and securing connections for the pumps mentioned, to wit whereby to afford means for aiding and rigidly holding the pumps in their proper positions with respect to the box-like structure. Also, by reference to Figs. 3, 4, 8 and 9 it will be noted how the box-like structure of this station may be covered and in a manner whereby the cover or top covering of the box-like structure can be employed to afford anchoring support for the pumps PP and SP and by which said pumps can derive further carrying and stabilizing support from the top plates or other supporting means resting or connected on the sidewalls of the pump providing chamber.

I claim:

1. A sewage system having a vortical detention and mixing zone made up of two substantially cylindrical tanks of substantially equal size of which one is a primary tank and one is a secondary tank, means for feeding clarified sewage tangentially to the primary tank, a hydraulic connection between the center of the bottom of each tank, a riser connected with that connection, means for pumping sewage from the riser and delivering a quantity thereof to each tank, a sedimenting clarifier, means for conducting sewage from the bottom section of the secondary tank to the clarifier inclined deck means with baffles for cascading and aerating sewage flowing downwardly thereover, means for conducting sewage from the riser to that deck, and means for conducting sewage from the lower section of the deck to deliver it tangentially into the tanks, whereby settled activated sludge is yielded in the clarifier.

2. A system acording to claim 1, wherein the deck has a plurality of baffles spaced sufficiently apart so that the plateau of sewage formed thereby has between it and its next adjacent baffle an inclined depressed sheet of sewage.

3. A system according to claim 1, wherein the deck has an incline that lies in a range of from one foot per hundred feet of length to five feet per hundred.

4. A system according to claim 1, wherein there are two inclined decks with a channel thereabove for feeding both decks therefrom, a further channel for each deck collecting sewage flowing down each deck and from which sewage is delivered tangentially to the respective tanks.

5. In an activated sludge plant having tank means wherein liquid detained therein undergoes a mixing operation; aerator means connected with the tank means for receiving liquid therefrom and having a longitudinally as well as a horizontally extending deck sloping laterally and downwardly from a longitudinally extending overflow edge to a lower longitudinally extending discharge edge; a liquid receiving and distributing trough along the overflow edge; a collective launder along the discharge edge; a pump having a conduit leading from a low elevation in the tank means; a pump-discharge conduit leading to the distributing trough; and a conduit leading from the collecting launder for delivering liquid therefrom into the tank means; said aerator means having transversely-spaced longitudinally extending flow-obstructing baffles.

6. A plant according to claim 5 in which the distributing trough has a marginal edge except at and along the overflow edge of the deck and which marginal edge is higher than the overflow edge, and in which the collecting launder has a marginal edge of the same general elevation as that of the marginal edge of the distributing trough except at and along the region whereat there is a delivery of liquid at and from a low discharge edge of the deck.

7. An activated sludge plant that comprises in operative combination, a detaining and mixing station providing tank means wherein there is detained while being mixed liquid in relative constant quantities; a recircling suction and pressure discharge type of pump means; aerator means having a longitudinally and horizontally extending deck sloping transversely and downwardly and having a liquid receiving and distributing trough disposed at and along a high overflow edge portion of said deck section and also having a collecting launder disposed at and along the low discharge edge of said deck section; a suction conduit means leading from said tank means to said pump means; a conduit leading from said pump means to aforementioned liquid receiving and distributing trough; flow return conduit leading from said collecting launder and returning liquid into tank means of the detaining and mixing section in a manner whereby the liquid detained in said last mentioned section is continuously swirled; means for release of treated liquid effluent from the body of liquid in said detaining and mixing section; and in which plant the aerator means thereof is characterized not only in that it is constructed whereby the pumped liquid delivered into the distributing trough flows laterally therefrom and continues laterally across said deck thence into the low collecting launder, but also in that flow of liquid across said deck is downwardly across transversely spaced shallow longitudinally extending baffles conducive to effecting cascading movements to the flow stream and also to the entraining of sucked-in air particles into the cascading liquid.

8. An activated sludge plant according to claim 7, wherein the aerator means has laterally sloping transversely-extending longitudinally-spaced flow defining strips rising from the aeration deck section and of vertical dimension greater than that of the low transversely extending baffles.

9. A plant according to claim 7, wherein the aerator means has longitudinally extending transversely spaced shallow grooved portions into which the shallow flow obstructing baffles may selectively be positioned.

10. A plant according to claim 7, wherein the aerator means has flow defining transversely extending forwardly sloping strips vertically slotted for receiving the ends of transverse flow baffling strips extending thereinto.

11. An aerator for sewage and other polluted wastes, which comprises an inclined deck down which sewage flows by gravity with the deck having an inclination that lies in a range of from one foot per hundred feet of length to five feet per hundred, and a plurality of upstanding baffles on the deck spaced sufficiently apart so that a plateau of sewage is formed upstream of each baffle and between each baffle and its next adjacent baffle there is formed an inclined depressed sheet of sewage.

References Cited in the file of this patent

UNITED STATES PATENTS

| Number | Name | Date |
| --- | --- | --- |
| 366,333 | Marble et al. | July 12, 1887 |
| 2,142,196 | Langdon | Jan. 3, 1939 |
| 2,388,795 | Montgomery et al. | Nov. 13, 1945 |
| 2,394,413 | Walker | Feb. 5, 1946 |
| 2,562,510 | Schlenz | July 31, 1951 |
| 2,574,685 | Baxter et al. | Nov. 13, 1951 |

FOREIGN PATENTS

| Number | Country | Date |
| --- | --- | --- |
| 176,494 | Great Britain | Mar. 7, 1922 |